(12) United States Patent
Dellock et al.

(10) Patent No.: US 10,381,185 B2
(45) Date of Patent: Aug. 13, 2019

(54) VEHICLE FUSE BOX FAULT INDICATOR

(71) Applicant: Ford Global Technologies, LLC, Dearborn, MI (US)

(72) Inventors: Paul Kenneth Dellock, Northville, MI (US); Pietro Buttolo, Dearborn Heights, MI (US); Stuart C. Salter, White Lake, MI (US); James J. Surman, Clinton Township, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/615,592

(22) Filed: Jun. 6, 2017

(65) Prior Publication Data

US 2018/0350548 A1 Dec. 6, 2018

(51) Int. Cl.
*H01H 85/32* (2006.01)
*H02H 3/04* (2006.01)
*H01H 85/30* (2006.01)
*H01H 85/20* (2006.01)

(52) U.S. Cl.
CPC ............ *H01H 85/32* (2013.01); *H02H 3/046* (2013.01); *H01H 85/30* (2013.01); *H01H 2085/208* (2013.01)

(58) Field of Classification Search
CPC .. H01H 85/30; H01H 85/32; H01H 2085/208; H02H 3/046
USPC ......................................... 337/241, 242, 243
See application file for complete search history.

(56) References Cited

U.S. PATENT DOCUMENTS

| 4,035,754 | A | * | 7/1977 | Kleinbohl | B60Q 11/00 337/206 |
| 4,514,723 | A | * | 4/1985 | Leal | G08B 5/36 337/241 |
| 4,935,856 | A | * | 6/1990 | Dragoon | B60Q 1/2696 362/307 |
| 5,739,737 | A | * | 4/1998 | Hatton | H01H 85/26 337/206 |
| 6,243,246 | B1 | | 6/2001 | Lin | |
| 7,683,752 | B1 | * | 3/2010 | Huss | H01H 85/20 337/206 |
| 8,686,596 | B2 | | 4/2014 | Huss et al. | |

(Continued)

FOREIGN PATENT DOCUMENTS

GB     2323981 A    10/1998

OTHER PUBLICATIONS

"Rylene Dye", Wikipedia, Dec. 3, 2013.*

(Continued)

*Primary Examiner* — Jacob R Crum
(74) *Attorney, Agent, or Firm* — Frank Lollo; Neal, Gerber & Eisenberg LLP; James P. Muraff

(57) ABSTRACT

A vehicle is disclosed for indicating when a fuse is blown in a vehicle fuse box. An example vehicle includes an electrical system, a fuse box comprising a door and an inner panel, covered in part with respective luminous materials and a plurality of fuses positioned inside the fuse box, coupled to the electrical system. Each fuse comprise an LED coupled between terminals of the fuse, and a lens configured to direct light from the LED toward the door and the inner panel.

20 Claims, 4 Drawing Sheets

(56) References Cited

U.S. PATENT DOCUMENTS

| | | | |
|---|---|---|---|
| 2006/0017540 A1* | 1/2006 | Smith | H01H 85/32 337/242 |
| 2006/0285280 A1* | 12/2006 | Shyu | H01H 85/32 361/628 |
| 2008/0111658 A1 | 5/2008 | Yang | |
| 2009/0237198 A1* | 9/2009 | Yang | H01H 85/0417 337/266 |
| 2010/0033293 A1* | 2/2010 | Cheng | H01H 85/32 337/241 |
| 2010/0102920 A1* | 4/2010 | Stanek | H01H 85/0013 337/186 |
| 2013/0058051 A1* | 3/2013 | Casey | H05K 7/1432 361/730 |
| 2014/0054286 A1* | 2/2014 | Kummer | H02G 3/12 220/3.9 |
| 2015/0138814 A1* | 5/2015 | Salter | B60Q 3/745 362/510 |
| 2015/0232019 A1* | 8/2015 | Salter | B60Q 1/2653 362/510 |

OTHER PUBLICATIONS

"Phosphor", Wikipedia, Jan. 27, 2012.*
Search Report dated Nov. 21, 2018 for GB Patent Application No. GB 1809120.7 (3 pages).

* cited by examiner

US 10,381,185 B2

VEHICLE FUSE BOX FAULT INDICATOR

TECHNICAL FIELD

The present disclosure generally relates to vehicle fuses, and, more specifically, systems and devices for detecting a blown fuse, identifying the particular blown fuse, and assisting in replacement of the blown fuse.

BACKGROUND

Modern vehicles may include various electrical systems and devices for use by the vehicle and/or occupants. Many of these systems and devices are coupled to fuses for the purpose of protecting the various components. The design of many vehicles includes a centralized location for the fuses, often called a fuse box. This fuse box may be located in various places within the vehicle, and sometimes can be hard to reach.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicles and vehicle fuse boxes that may detect a blown fuse and assist a user in replacing the blown fuse. An example disclosed vehicle includes an electrical system, and a fuse box comprising a door and an inner panel, covered in part with respective luminous materials. The vehicle also includes a plurality of fuses positioned inside the fuse box, coupled to the electrical system. Each fuse comprises an LED coupled between terminals of the fuse, and a lens configured to direct light from the LED toward the door and the inner panel.

An example disclosed vehicle fuse box includes a door made in part from a first luminous material, an inner panel made in part from a second luminous material, and a plurality of fuses positioned in a plurality of cavities of the inner panel. Each of the fuses comprises an LED coupled between terminals of the fuse, configured to emit light when the fuse is tripped, and a lens configured to direct light from the LED toward the door and the inner panel.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
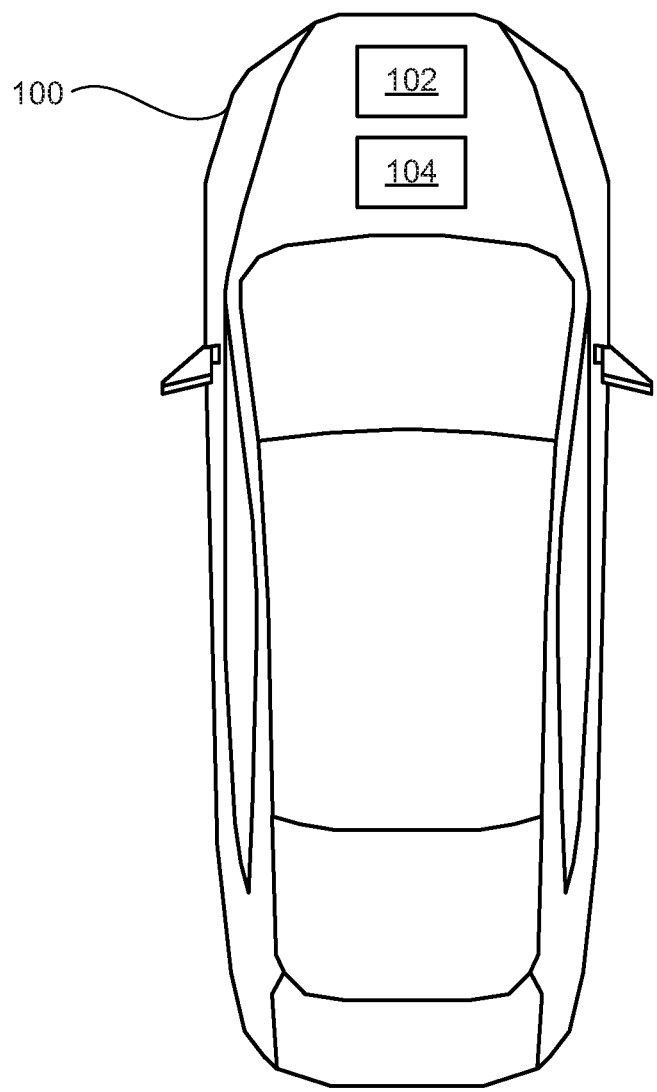
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, many vehicles include electrical systems operating in the vehicle. When a problem arises with one or more of the electrical systems, it may be difficult for a driver of the vehicle to determine the cause of the problem and take corrective action. In some cases, one or more electrical systems may be dependent on each other, leading to confusion about the cause of the problem.

It may be particularly difficult for a driver to recognize when a fuse for a particular electrical system has failed. Often the only indication that a fuse has blown is that the electrical system stops functioning. Further, a fuse box of the vehicle may be in a not easily accessible location, or not within view of a driver of the vehicle under normal circumstances.

Still further, when a fuse is blown at night (and/or based on the location in the vehicle), the fuse box may not be well lit. And if a lighting fuse is blown, the vehicle lights may not be able to provide any help in illuminating the fuse box. This may cause difficulty for a driver in determining the cause of the electrical system failure, determining the particular fuse that needs to be replaced or reset, and in taking action to fix the blown fuse.

Examples of the present disclosure may provide one or more indications that a fuse has failed. The indications may be present on the blown fuse, the area surrounding the fuse inside the fuse box, and outside the fuse box. This may allow a driver to quickly determine the cause of an electrical system failure, determine the particular fuse that has failed, and to fixed the failed fuse even in a dimly lit or dark environment.

An example vehicle of the present disclosure may include one or more electrical systems and a fuse box. The fuse box may include a door and an inner panel, each covered in part with a respective luminous material. The luminous materials may be different, may have different properties, and may perform different function. The door may be covered in a quick acting luminous material (such as a rylene dye), such that it may glow or emit light immediately or shortly after a fuse is blown. The inner panel may have a longer lasting luminous material (such as a long persistence phosphor), such that it may continue to glow for a period of time after the fuse is blown, to indicate which fuse is blown and assist a driver visually in replacing the fuse.

The example vehicle may also have a plurality of fuses positioned inside the fuse box, respectively coupled to the electrical systems of the vehicle. In some examples, each fuse may be coated in or manufactured with a luminous material, such as a rylene dye or long persistence phosphor. Each fuse may be positioned in a cavity within the inner panel of the fuse box.

Each fuse may include an LED coupled between terminals of the fuse, such that when the fuse functions under normal conditions the LED is bypassed. However when the fuse fails, the LED may be activated and may emit light, indicating that the fuse has blown.

Each fuse may also include a lens. The lens may include one or more light pipes or other light based components, such as reflectors, refractors, and/or light guides. The lens may be configured to direct light from the LED toward both the door of the fuse box and the inner panel. The light from the LED may be absorbed by the various luminous materials on the door, inner panel, and/or fuse.

In some examples, the lens may be configured to direct light from the LED toward an area surrounding the fuse. The luminous material on the inner panel surrounding the fuse may be illuminated, may absorb the LED light, and may emit light for a period of time after the fuse and LED are removed.

The lens may also be configured to disperse the LED light onto an area of the inside of the fuse box door. This area may be covered by the luminous material, and may glow, such that a driver outside the box can see the glow. The inside of the fuse box door may also include instructions that may be written in luminous material. The LED light may illuminate the instructions, which may absorb the LED light and glow for a period of time. In this manner, the instructions may be visible even in dark environments without external lighting.

FIG. 1 illustrates an example vehicle 100 according to embodiments of the present disclosure. Vehicle 100 may be a standard gasoline powered vehicle, a hybrid vehicle, an electric vehicle, a fuel cell vehicle, and/or any other mobility implement type of vehicle. Vehicle 100 may include parts related to mobility, such as a powertrain with an engine, a transmission, a suspension, a driveshaft, and/or wheels, etc. Vehicle 100 may be non-autonomous, semi-autonomous (e.g., some routine motive functions controlled by the vehicle 100), or autonomous (e.g., motive functions are controlled by vehicle 100 without direct driver input). In the illustrated example, vehicle 100 includes an electrical system 102 and a fuse box 104.

The electrical system 102 may be any device or system electrically coupled to the battery, alternator, or other vehicle power source. Example electrical systems may include the vehicle exterior lights, interior lights, radio, display, vehicle sensors, and more. Electrical system 102 may be any system or device of vehicle 100 that makes use of a fuse.

Fuse box 104 may be a centralized box that includes fuses for one or more electrical systems 102. The fuse box may be any shape, and can be located at any place within the vehicle. For instance, some vehicle fuse boxes are located on a side of the dash board, under the instrument panel, on a side of the instrument panel, or under the hood of the vehicle. Fuse boxes are not often used by vehicle drivers when the vehicle functions properly, so they may be out of the way or in hard to reach places.

Figure 2:
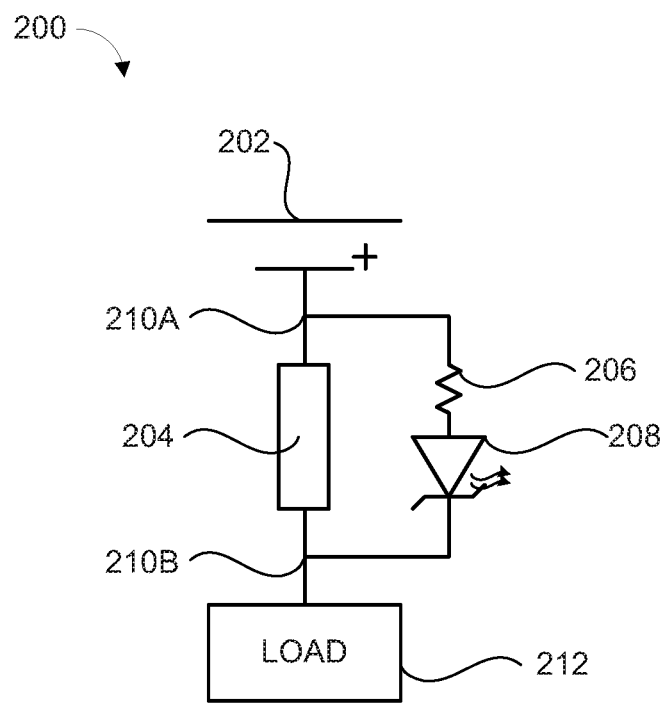
FIG. 2 illustrates a circuit diagram of an example fuse according to embodiments of the present disclosure.

FIG. 2 illustrates a simplified circuit diagram of an example fuse 200 according to embodiments of the present disclosure. FIG. 2 shows a power source 202 electrically coupled to a fuse element 204 and a current limiting resistor 206 at a first terminal 210A. The current limiting resistor is coupled to an LED 208. And the fuse element 204 and LED 208 are coupled to an electrical load 212 (e.g., electrical system 102) at a second terminal 210B. In this configuration, LED 208 is electrically coupled between terminals 210A and 210B of the fuse.

Under normal operation, fuse element 204 may short circuit the current limiting resistor 206 and LED 208, such that no current (or a negligible amount of current) passes through the LED. When fuse element 204 is tripped, current may pass through LED 208, causing LED 208 to emit light. The fuse element may be tripped when an electrical system or load 212 draws an amount of current higher than the fuse is rated for or configured to handle.

Power source 202 may be any vehicle power source including the vehicle battery and alternator. LED 208 may be any light emitting diode, including any diode configured to emit visible, infrared, or other light. One particular example may include an LED configured to emit blue light.

Figure 3:
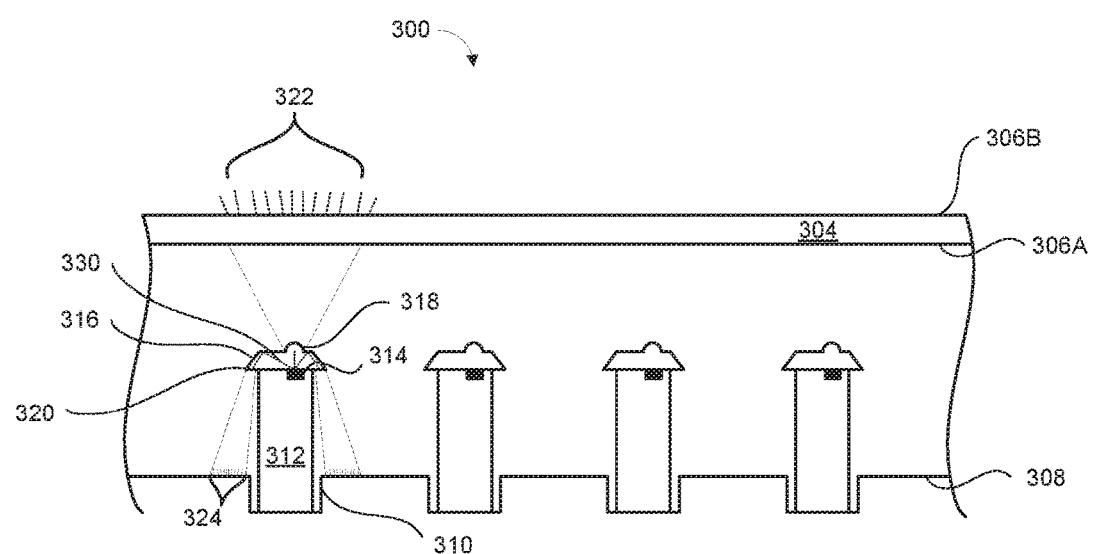
FIG. 3 illustrates a cross section view of an example fuse box according to embodiments of the present disclosure.

FIG. 3 illustrates a cross section view of an example fuse box 300 including a plurality of fuses 312. The fuse box may include a door 304 and an inner panel 308. The fuse box door 304 may include an inner surface 306A and an outer surface 306B. And inner panel 308 may include one or more cavities 310 into which the fuses 312 are positioned.

The door 304 and inner panel 308 may include first and second luminous materials configured to glow, shine, or otherwise give off light for a period of time when exposed to light. In some examples, the luminous material may be painted on, sprayed on, or otherwise added to the door 304 and/or inner panel 308 after manufacture. In other examples, the luminous materials may be added to the process of manufacturing, such that the door 304 and/or inner panel 308 are molded, infused, or otherwise manufactured with the luminous material (among other materials).

The door 304 and/or inner panel 308 may be covered in part, such that only certain portions include the luminous material. In this way, only certain portions may glow, and may provide an indication of a blown fuse.

Further both the inner surface 306A and outer surface 306B may be covered in whole or in part. The fuse box door 304 may be configured such that when light is exposed to an inner surface 306A, the luminous material on the outer surface 306B may glow. In this manner, a person viewing the fuse box from the outside may be able to see that a fuse is blown without opening the fuse box.

In some examples, the luminous materials may include a rylene dye, which may glow with a red color when exposed to light from the LED. The luminous materials may also include a long persistence phosphor, which may glow in any number of colors when exposed to light and for a time thereafter. In some examples, the luminous materials may be selected such that they glow with different colors. The luminous materials may be materials selected for their particular properties, such as amount of light absorption, the spectrum of light absorbed, the color emitted, the amount of time emitted after exposure to light, and more.

In some examples, a first luminous material may be selected for the door 304 and a second different luminous material may be selected for the inner panel 308. The first luminous material may absorb and emit light better, faster, or more efficiently than the second material, such that the first material begins to glow before the second luminous material when exposed to the same light. However the second luminous material may have properties that allow it to emit light over a longer period of time after exposure to light. One or more other properties may be selected for as well.

FIG. 3 also illustrates a plurality of fuses 312 positioned within the fuse box 300. Each fuse 312 may be positioned in a cavity of the inner panel 308, and may be coupled to a respective electrical system (not shown).

In some examples, one or more fuses may be covered in whole or part, or manufactured with, a luminous material. As such, each fuse 312 may have one or more properties or functions such as those described with respect to the door 304 and inner panel 308 of the fuse box 300. Fuse 312 may glow when exposed to light. Each fuse 312 of may include one or more LEDs 314 coupled between terminals of the fuse, such as is described with respect to FIG. 2. The LED 314 may be configured to emit light when the fuse is tripped.

In some examples, the LED and luminous material(s) may be selected such that light form the LED causes a first luminous material to glow with a first color and to emit light while the LED is on, but may not emit light when the LED is off. And a second luminous material may be selected such that light from the LED is absorbed and emitted over a longer period of time, including after the LED has stopped providing light. In this manner, a first luminous material that may be fast acting can be used to indicate that there is a blown fuse, while a second luminous material can indicate the specific fuse that is blown.

Each fuse 312 may also include a lens 316. Lens 316 may include one or more elements configured to direct light emitted by the LED 314. For instance, lens 316 may include one or more reflectors, domes, light pipes 330, refractors, mirrors, or other optical components.

FIG. 3 illustrates a lens 316 having a dome 318 configured to disperse light onto the inner surface 306A of the door 304. Lens 316 in FIG. 3 also includes a reflector 320 configured to direct light from the LED 314 toward the inner panel 308.

In some examples, the lens 316 may be positioned on a side of the fuse 312 facing the inner surface 306A of the door 304 such that light from the LED 314 is directed in a first direction toward the inner surface 306A of the door 304, and in a second direction toward the inner panel of the fuse box. The lens may thus be configured to direct light form the LED in two opposite directions. In some examples, the lens 316 may include one or more light pipes 330 configured to direct light at either the door 304 or the inner panel 308.

FIG. 3 illustrates a scenario in which the lens 316 directs light toward an area surrounding the fuse 312. This is shown as area 324. Further, the dome 318 of lens 316 may be configured to direct light toward an area 322 of the inner surface 306A of the door 304. Area 322 may be large compared to the width of the fuse 312, such that luminous material in area 322 may be illuminated and allow a user to better see the glow.

Lens 316 may also direct light from LED 314 toward an area 324 of the inner panel 308. Area 324 may glow and may provide task lighting for a user while changing fuse 312.

Figure 4A:
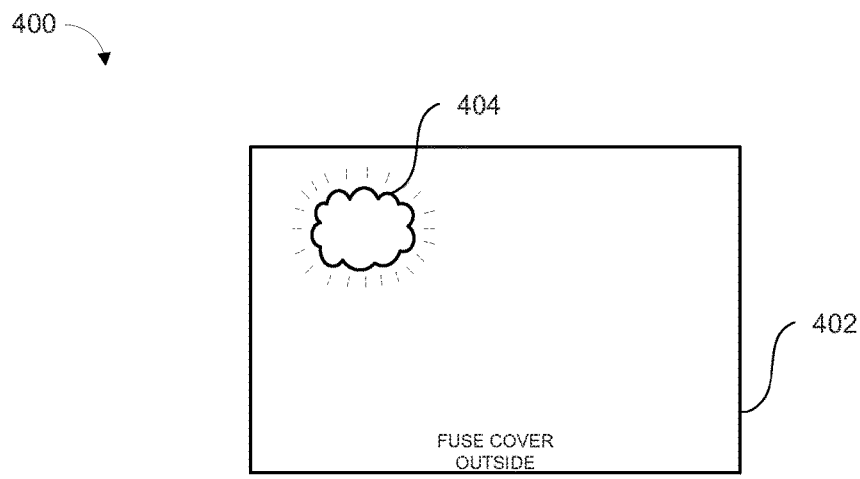
FIGS. 4A and 4B illustrate an example fuse box in closed and open states according to embodiments of the present disclosure.
Figure 4B:
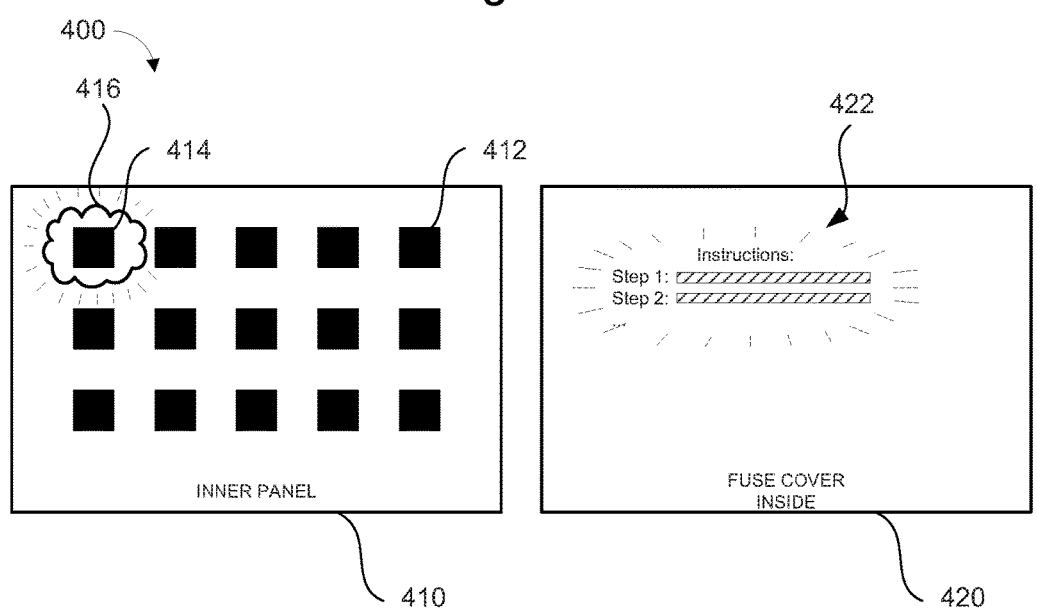

FIGS. 4A and 4B illustrate an example fuse box 400 in a closed (FIG. 4A) and open (FIG. 4B) state. These figures illustrate the functions of the various components described herein when a fuse is tripped, causing an LED to emit light.

FIG. 4A illustrates a view from outside the fuse box after a fuse has blown. The door 402 of the fuse box includes a glowing area 404 which may indicate that a fuse has blown. The location of the glowing are 404 may correspond to the particular blown fuse. As such, a user may understand that a fuse on the lop left corner of the fuse box has blown.

It should be noted that the luminous material covering or integrated with the door 402 is receiving light from an LED inside fuse box 400, and is emitting a glow visible by a user outside the fuse box.

FIG. 4B illustrates a view with the fuse box door removed. The inner panel 410 includes a plurality of fuses 412. It can be seen that fuse 414 has blown, and the corresponding LED light has been directed to the area 416 surrounding fuse 414.

FIG. 4B also illustrates an example inner surface 420 of the fuse box door. The inner surface 420 may include one or more instructions 422 that may assist a user in replacing or resetting one or more fuses 412. The instructions 422 may be applied to the inner surface 420 using a luminous material, such that they glow. This may allow a user to replace or rest a blown fuse without the use of an external light source.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   an electrical system;
   a fuse box comprising:
   a door and an inner panel, covered in part with respective luminous materials; and
   a plurality of fuses mounted on the inner panel and coupled to the electrical system, each fuse comprising:
   an LED coupled to the fuse; and
   a lens mounted on the LED, the lens configured to reflect light from the LED towards a portion of the inner panel surrounding the fuse, the lens comprising:
   an internal surface; and
   at least one reflector disposed on the internal surface, wherein the at least one reflector is configured to reflect the light to the portion, wherein the fuse extends along a first direction, wherein the at least one reflector extends beyond the fuse along a second direction crossing the first direction.

2. The vehicle of claim 1, wherein the door is covered with a first luminous material and the inner panel is covered with a second luminous material, wherein first and second luminous materials are different.

3. The vehicle of claim 2, wherein the first luminous material covering the door is configured to emit light while the LED is on, and wherein the second luminous material covering the inner panel is configured to absorb LED light and emit light over a period of time.

4. The vehicle of claim 2, wherein the first luminous material is a rylene dye and the second luminous material is a phosphor configured to emit light for a longer duration than the first luminous material.

5. The vehicle of claim 2, wherein the LED is configured to emit blue light, the first luminous material is configured to emit a red glow, and the second luminous is configured to emit a white glow.

6. The vehicle of claim 1, wherein the door is made from a material comprising the luminous material, such that an outer surface of the door emits light when light from the LED is directed to an inner surface of the door.

7. The vehicle of claim 1, wherein each fuse is positioned in a cavity defined by the inner panel.

8. The vehicle of claim 1, wherein each fuse is configured to be removed from the fuse box, and wherein the luminous material covering the inner panel is configured to absorb light from the LED and emit light after fuse has been removed.

9. The vehicle of claim 1, wherein the lens is positioned on a side of the fuse facing an inner surface of the door, such that light is directed in a first direction toward the inside surface of the door, and in a second direction toward the inner panel, wherein the first direction is opposite the second direction.

10. The vehicle of claim 1, wherein the lens further comprises two or more light pipes, each light pipe configured to direct light at either the door or the inner panel.

11. The vehicle of claim 1, wherein the lens further comprises a dome configured to disperse light onto an inner surface of the door.

12. The vehicle of claim 1, wherein a first portion of the door is covered with a first luminous material, a second portion of the door is covered with a second luminous material, and the inner panel is covered with the second luminous material, and wherein the second portion of the door comprises one or more instructions for a user.

13. A vehicle fuse box comprising;
a door made in part from a first luminous material;
an inner panel made in part from a second luminous material; and
a plurality of fuses mounted on the inner panel, each of the fuses comprising:
an LED coupled between terminals of the fuse, configured to emit light when the fuse is tripped; and
a lens mounted on the LED, the lens configured to reflect the light from the LED towards a portion of the inner panel surrounding the fuse, the lens comprising:
an internal surface; and
at least one reflector disposed on the internal surface, wherein the at least one reflector is configured to reflect the light to the portion, wherein the fuse extends along a first direction, wherein the at least one reflector extends beyond the fuse along a second direction crossing the first direction.

14. The vehicle fuse box of FIG. 13, wherein the first luminous material covering the door is a rylene dye configured to emit light while the LED is on, and wherein the second luminous material covering the inner panel is a phosphor configured to absorb LED light and emit light over a period of time after the LED is off.

15. The vehicle fuse box of claim 13, wherein the door is configured to emit light from an outside surface when light from the LED is directed to an inner surface of the door.

16. The vehicle fuse box of claim 13, wherein the lens further comprises two or more light pipes, each light pipe configured to direct light at either the door or the inner panel.

17. The vehicle fuse box of claim 13, wherein the lens further comprises a dome, and wherein the dome is configured to disperse light onto an inner surface of the door.

18. The vehicle of claim 1, wherein the fuse comprises:
a first end contacting the inner panel; and
a second end comprising the LED and contacting the lens, the second end opposing the first end.

19. The vehicle of claim 18, wherein the LED is positioned between the lens and the second end.

20. The vehicle of claim 1, wherein the at least one reflector is further configured to direct a first portion of the light in a first direction, wherein the lens further comprises a dome.

* * * * *